US012673689B2

(12) United States Patent
Weston et al.

(10) Patent No.: US 12,673,689 B2
(45) Date of Patent: Jul. 7, 2026

(54) SYSTEMS AND METHODS TO ADJUST VEHICLE PARAMETERS IN A GEOFENCED AREA

(71) Applicant: Ford Global Technologies, LLC, Dearborn, MI (US)

(72) Inventors: Keith Weston, Canton, MI (US); Matthew Flis, Northville, MI (US); Matthew Johnson, Toledo, OH (US); Brendan Diamond, Naples, FL (US); Andrew Denis Lewandowski, Sterling Heights, MI (US)

( * ) Notice: Subject to any disclaimer, the term of this patent is extended or adjusted under 35 U.S.C. 154(b) by 105 days.

(21) Appl. No.: 18/750,432

(22) Filed: Jun. 21, 2024

(65) Prior Publication Data

US 2025/0388223 A1 Dec. 25, 2025

(51) Int. Cl.
*B60W 50/04* (2006.01)
*B60K 35/26* (2024.01)
*B60W 40/068* (2012.01)
*B60W 50/00* (2006.01)
(Continued)

(52) U.S. Cl.
CPC ........... *B60W 50/045* (2013.01); *B60K 35/26* (2024.01); *B60W 40/068* (2013.01); *B60W 50/0098* (2013.01); *H04W 4/38* (2018.02); *H04W 4/46* (2018.02); *B60W 2050/046* (2013.01); *B60W 2720/26* (2013.01); *B60W 2720/28* (2013.01); *B60W 2720/30* (2013.01)

(58) Field of Classification Search
CPC ............. B60W 50/045; B60W 40/068; B60W 50/0098; B60W 2050/046; B60W 2720/26; B60W 2720/28; B60W 2720/30; B60K 35/26; H04W 4/38; H04W 4/46
See application file for complete search history.

(56) References Cited

U.S. PATENT DOCUMENTS

| | | | |
|---|---|---|---|
| 9,863,928 B1 * | 1/2018 | Peterson | G01N 33/42 |
| 10,089,868 B1 | 10/2018 | Hayward | |
| 10,300,930 B2 | 5/2019 | Lathrop et al. | |

(Continued)

FOREIGN PATENT DOCUMENTS

DE 102020107153 A1 10/2020

OTHER PUBLICATIONS

Mikko Rinne, et al., Mobile Crowdsensing of Parking Space Using Geofencing and Activity Recognition, ResearchGate, https://www.researchgate.net/publication/287640941, Jun. 16-19, 2014, pp. 1-11.

*Primary Examiner* — Sze-Hon Kong
(74) *Attorney, Agent, or Firm* — Frank Lollo; Eversheds Sutherland (US) LLP

(57) ABSTRACT

A vehicle including a sensor unit and a processor is disclosed. The sensor unit may be configured to detect surface characteristics of a surface on which the vehicle is located. The processor may be configured to determine that the vehicle is located in a predefined geofenced area. Responsive to determining that the vehicle is located in the predefined geofenced area, the processor may determine that the surface characteristics may be equivalent to predefined characteristics based on inputs obtained from the sensor unit. The processor may adjust one or more vehicle operating parameters responsive to determining that the surface characteristics may be equivalent to the predefined characteristics.

17 Claims, 4 Drawing Sheets

(51) Int. Cl.
    *H04W 4/38*             (2018.01)
    *H04W 4/46*             (2018.01)

(56)                 References Cited

U.S. PATENT DOCUMENTS

| | | | |
|---|---|---|---|
| 10,410,516 | B1 | 9/2019 | Andersson et al. |
| 2015/0033864 | A1* | 2/2015 | Kumar ............... G01N 29/4454 |
| | | | 73/636 |
| 2019/0019044 | A1* | 1/2019 | Motohashi ............... G08G 1/16 |
| 2020/0238998 | A1* | 7/2020 | Dasalukunte ........ G08G 1/0969 |
| 2020/0341491 | A1* | 10/2020 | Kamini .................... G08G 1/20 |
| 2022/0126864 | A1 | 4/2022 | Moustafa et al. |
| 2022/0198921 | A1* | 6/2022 | Kangasrääsiö ...... G08G 1/0116 |
| 2022/0388517 | A1* | 12/2022 | Yokoyama ............ B60W 20/40 |
| 2025/0115248 | A1* | 4/2025 | Otoofi ..................... H04W 4/46 |
| 2025/0189432 | A1* | 6/2025 | Lee ......................... G01N 19/02 |
| 2025/0225795 | A1* | 7/2025 | Boehm ................. H04W 4/021 |
| 2025/0333063 | A1* | 10/2025 | Feng .............. B60W 30/18172 |

* cited by examiner

238

302

Speed limit in this
property is 10 miles/hour

102

400

402 — Start

404 — Determine that a vehicle is located in a predefined geofenced area

406 — Determine that surface characteristics are equivalent to predefined characteristics 408 — Adjust a vehicle operating parameter 410 — Stop

SYSTEMS AND METHODS TO ADJUST VEHICLE PARAMETERS IN A GEOFENCED AREA

FIELD

The present disclosure relates to systems and methods to adjust one or more vehicle operating parameters when a vehicle is located in a predefined geofenced area or a private property.

BACKGROUND

Many property owners prefer vehicles (e.g., commercial vehicles or guest vehicles) to move on their properties in a predefined manner. For example, many owners prefer the vehicles to move within a predefined speed limit (e.g., less than 15 or 20 miles/hour), not make swift turns, etc., when the vehicles are in the private property. Typically, the owners place placards to inform the vehicle drivers about the preferred manner of vehicle movement in the private property.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
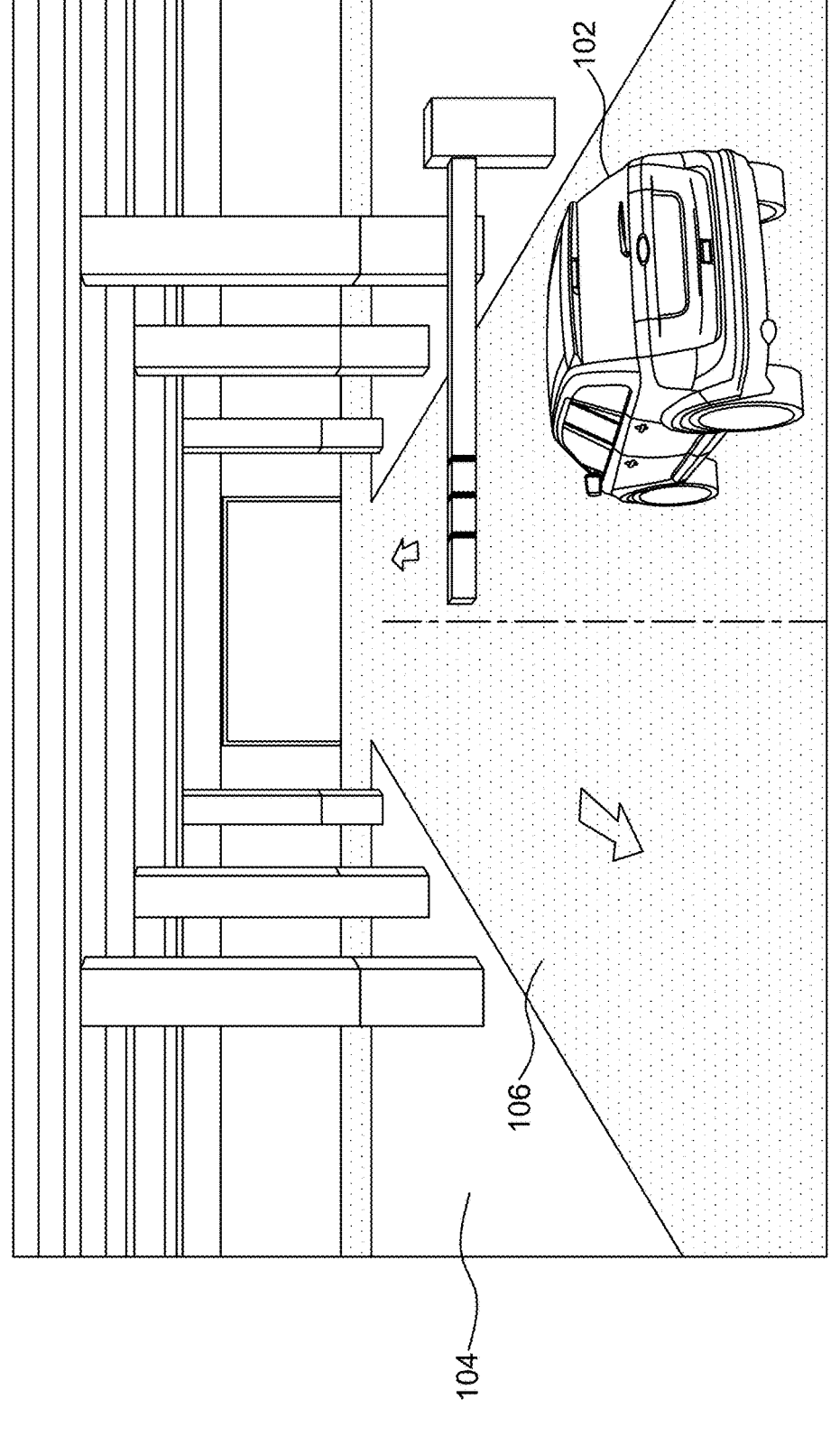
FIG. 1 depicts an environment in which techniques and structures for providing the systems and methods disclosed herein may be implemented.

The present disclosure describes a vehicle that may adjust one or more vehicle operating parameters based on predefined rules, when the vehicle may be located in a private property or a predefined geofenced area ("area"). The predefined rules may be defined by an area owner, a fleet operator/manager (e.g., when the vehicle is part of a vehicle fleet), a vehicle manufacturer, and/or the like and/or may be based on surface characteristics of the area surface on which the vehicle may be located/traveling. The surface characteristics may be, for example, a surface type, a coefficient of surface friction, etc. The vehicle operating parameters that may be adjusted by the vehicle at the area may include, but are not limited to, a vehicle speed limit, a slip control setting, an Advanced Driver Assistance System (ADAS) setting, a steering wheel angle limit, a vehicle wheel force control setting, a rate of torque application, and/or the like.

In some aspects, when the vehicle may be located in the area, the vehicle may determine the surface characteristics based on inputs obtained from a vehicle sensor unit. The sensor unit may include, for example, interior and exterior cameras, microphone, etc. Responsive to determining the surface characteristics, the vehicle may compare the determined surface characteristics with predefined characteristics and check whether the determined surface characteristics may be equivalent to the predefined characteristics. In one exemplary aspect, when the surface characteristics may be associated with a surface type, the vehicle may determine that the surface characteristics may be equivalent to the predefined characteristics when the determined surface type may be equivalent to a predefined surface type (e.g., an epoxy floor). In another exemplary aspect, when the surface characteristics may be associated with a surface friction coefficient, the vehicle may determine that the surface characteristics may be equivalent to the predefined characteristics when the determined surface friction coefficient may be equivalent to or less than a predefined level (indicating a slippery floor).

Responsive to determining that the surface characteristics may be equivalent to the predefined characteristics, the vehicle may adjust one or more vehicle operating parameters based on the predefined rules, so that a probability or chances of the vehicle tires slipping on the area surface may be reduced (thereby preventing the tires from affecting the surface appearance/condition). For example, responsive to determining that the surface characteristics may be equivalent to the predefined characteristics, the vehicle may adjust the vehicle speed limit, the slip control setting, and/or the like to lower thresholds to prevent the tires from slipping.

In addition or alternative to adjusting the vehicle operating parameters when the surface characteristics are equivalent to the predefined characteristics, the vehicle may adjust the vehicle operating parameters when a level of sound emanating from the vehicle tires while moving on the area surface may be greater than a predefined sound level. In this case, the vehicle may adjust the vehicle operating parameters to reduce the noise/sound, thereby preventing the area occupants from facing inconvenience and/or preventing the tires from affecting the surface appearance/condition.

In further aspects, the vehicle may transmit information associated with the adjusted vehicle operating parameters to other vehicles that may be located in the same area, so that the other vehicles may also apply the same settings.

The present disclosure discloses a vehicle that may facilitate in ensuring that the vehicle travels in a private property or a predefined geofenced area according to the predefined rules that may be set/defined by the area owner and/or the fleet operator. Since the vehicle travels according to the predefined rules, the area surface is not affected by the vehicle tires, and the area occupants are not inconvenienced. Further, the vehicle adjusts the vehicle operating parameters based on the surface characteristics of the area surface, thereby ensuring that the operating parameters are adjusted differently for different surface types.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an environment 100 in which techniques and structures for providing the systems and methods disclosed herein may be implemented. The environment 100 may include a vehicle 102 that may take the form of any passenger or commercial vehicle such as a car, a work vehicle, a crossover vehicle, a truck, a van, a minivan, a taxi, a bus, etc. The vehicle 102 may be a manually driven vehicle or may be configured to operate in a partially/fully autonomous mode. Further, the vehicle 102 may include any powertrain such as a gasoline engine, one or more electrically-actuated motor(s), a hybrid system, etc.

The vehicle 102 may be entering or locating at a predefined geofenced area 104 (or area 104), which may be, for example, a private property, a parking lot, a building complex, and/or the like. In some aspects, the vehicle 102 may be configured to adjust one or more vehicle operating parameters when the vehicle 102 may be located at the area 104 (i.e., a private property), so that the area 104 and/or its occupants are not affected. The adjustment of the vehicle operating parameters may be based on a preference of vehicle movement in the area 104 that may be defined by an area owner and/or a fleet manager/operator (e.g., when the vehicle 102 is part of a vehicle fleet) and/or may be based one or more parameters such as surface characteristics of a floor/surface 106 of the area 104, a sound level of sound emanating from one or more vehicle wheels/tires when the tires contact or move on the surface 106, and/or the like.

Examples of the vehicle operating parameters that may be adjusted by the vehicle 102 at the area 104 include, but are not limited to, a vehicle Advanced Driver Assistance System (ADAS) setting, a vehicle slip control setting, a steering wheel angle limit, a vehicle wheel force control setting, a rate of torque application, a vehicle speed, and/or the like. The process of adjusting the vehicle operating parameters is briefly described below and described in detail later in conjunction with FIG. 2.

Firstly, the vehicle 102 may determine that the vehicle 102 has entered or is located at the area 104 by comparing a real-time vehicle geolocation with a geolocation information associated with the area 104 (that may be pre-stored in a vehicle memory or obtained from a server) and/or by comparing images of vehicle's surroundings captured by one or more vehicle cameras with an area 104 image (that may be pre-stored in a vehicle memory or obtained from a server). In some aspects, the vehicle 102 may determine that the vehicle 102 may be located at (or entered) the area 104 when the real-time vehicle geolocation matches with the geolocation information and/or the vehicle's surrounding images match with the area 104 image(s).

Responsive to determining that the vehicle 102 is located at the area 104, the vehicle 102 may obtain inputs from a vehicle sensor unit (shown as vehicle sensory system 232 in FIG. 2) and determine the surface characteristics of the surface 106 on which the vehicle 102 may be located based on the obtained inputs. The surface characteristics may include, for example, a surface type (e.g., whether the surface 106 is an epoxy surface, a concrete surface, etc.), a surface friction coefficient ($\mu$), and/or the like.

The sensor unit may include vehicle interior and exterior cameras, vehicle microphones, and/or the like, and the inputs captured/determined by the sensor unit may include images of the surface 106, surface or light reflectivity off the surface 106, a sound level of sound (e.g., a "squeaking" sound) emanating from one or more vehicle wheels/tires when the tires contact or move on the surface 106, the surface friction coefficient, the surface type, and/or the like.

Responsive to determining the surface characteristics based on the inputs obtained from the sensor unit, the vehicle 102 may compare the determined surface characteristics with predefined characteristics (information of which may be pre-stored in the vehicle memory or obtained from a server) and determine that the surface characteristics may be equivalent to the predefined characteristics based on the comparison. In an exemplary aspect, when the surface characteristics are associated with the surface type, the vehicle 102 may determine that the surface characteristics may be equivalent to the predefined characteristics when the surface type may be equivalent to a predefined type (e.g., an epoxy type of surface/floor or a surface type with high reflectivity/shine). In another exemplary aspect, when the surface characteristics are associated with the surface friction coefficient, the vehicle 102 may determine that the surface characteristics may be equivalent to the predefined characteristics when the surface friction coefficient may be equivalent to or less than a predefined friction coefficient (indicating that the surface 106 may be slippery).

A person ordinarily skilled in the art may appreciate that when the surface 106 is slippery or made of epoxy (as an example), the vehicle movement on the surface 106 may affect the surface condition. For example, if the vehicle 102 moves fast on such a surface or makes rapid turns, the vehicle tires may leave tire marks on the surface 106, which may affect the surface's appearance and/or condition. Therefore, to prevent such instances from happening, the vehicle 102 may adjust the vehicle operating parameters such that the effect of the vehicle movement on the surface 106 may be minimized, responsive to determining that the surface characteristics are equivalent to the predefined characteristics as described above.

As an example, responsive to determining that the surface 106 may be made of epoxy or a slippery material, the vehicle 102 may reduce the vehicle speed to be within a predefined speed limit (that may be preset/defined by the area owner or the fleet operator) or adjust the vehicle's speed limit, adjust vehicle's ADAS and/or slip control settings (e.g., an ABS setting, a traction control setting and/or an electronic stability control setting may be adjusted to lower slip targets), limit vehicle's steering wheel rotation angle, and/or the like. The vehicle 102 may adjust the vehicle operating parameters, as described above, to reduce the probability or chances of the vehicle tires slipping on the surface 106 and affecting the surface condition and/or the vehicle movement affecting the area's occupants.

As described above, the adjustment of the vehicle operating parameters (e.g., the vehicle speed limit, ADAS setting, slip control setting, steering wheel angle setting, etc.) may be based on the preference of vehicle movement in the area 104 that may be defined by the area owner and/or the fleet manager/operator. In additional or alternative aspects, the vehicle 102 may itself determine an optimal vehicle operating parameter setting based on the determined surface characteristics. For example, if the determined surface friction coefficient is very low, the vehicle 102 may limit the vehicle speed, the slip control setting, the steering wheel angle setting, etc. to a low value, so that vehicle slippage on the surface 106 may be prevented (thereby preventing any adverse effect on the surface 106 resulting from the vehicle movement). On the other hand, if the determined surface friction coefficient is relatively higher, the vehicle 102 may limit the vehicle speed, the slip control setting, the steering wheel angle setting, etc. to a relatively higher value, so that the driver's convenience/comfort of driving the vehicle 102 on the surface 106 is not compromised.

Although the description above describes an aspect where the vehicle 102 adjusts the vehicle operating parameters responsive to determining that the surface characteristics are equivalent to the predefined characteristics, the present disclosure is not limited to such an aspect. In additional or alternative aspects, the vehicle 102 may determine a sound level of the sound emanating from one or more vehicle wheels/tires when the tires contact the surface 106 based on the inputs obtained from the vehicle microphone (which may be part of or separate from the sensor unit) and adjust the vehicle operating parameters when the sound level may be greater than a predefined sound level. Stated another way, the vehicle 102 may adjust the vehicle operating parameters when the tires may be making sound (e.g., a squeaky sound) above the predefined sound level, when the tires may be moving on the surface 106. A person ordinarily skilled in the art may appreciate that along with increasing the sound pollution (and hence causing inconvenience to the area occupants), a high sound level emanating from the tires contacting the surface 106 may indicate a higher probability of the tries skidding or slipping on the surface 106, thereby increasing the probability or chances of the surface 106 getting affected by the tire movement.

To prevent such instances from happening, the vehicle 102 may automatically reduce or limit the vehicle speed, adjust slip control setting, limit steering wheel rotation and/or pedal/torque application rates, to reduce or eliminate the sound emanating from the tires.

In this manner, the vehicle 102 ensures that the surface 106 is not affected when the vehicle 102 is located at the area 104 (i.e., a private property) and, at the same time, ensures that the area occupants do not face any inconvenience. Further vehicle details and actions performed by the vehicle 102 are described below in conjunction with FIG. 2.

The vehicle 102 and/or the vehicle driver implement and/or perform operations, as described here in the present disclosure, in accordance with the owner manual and safety guidelines. In addition, any action taken by the vehicle driver based on the notifications/recommendations provided by the vehicle 102 should comply with all the rules specific to the location and operation of the vehicle 102 (e.g., Federal, state, country, city, etc.). The notifications/recommendations, as provided by the vehicle 102, should be treated as suggestions and only followed according to any rules specific to the location and operation of the vehicle 102.

Figure 2:
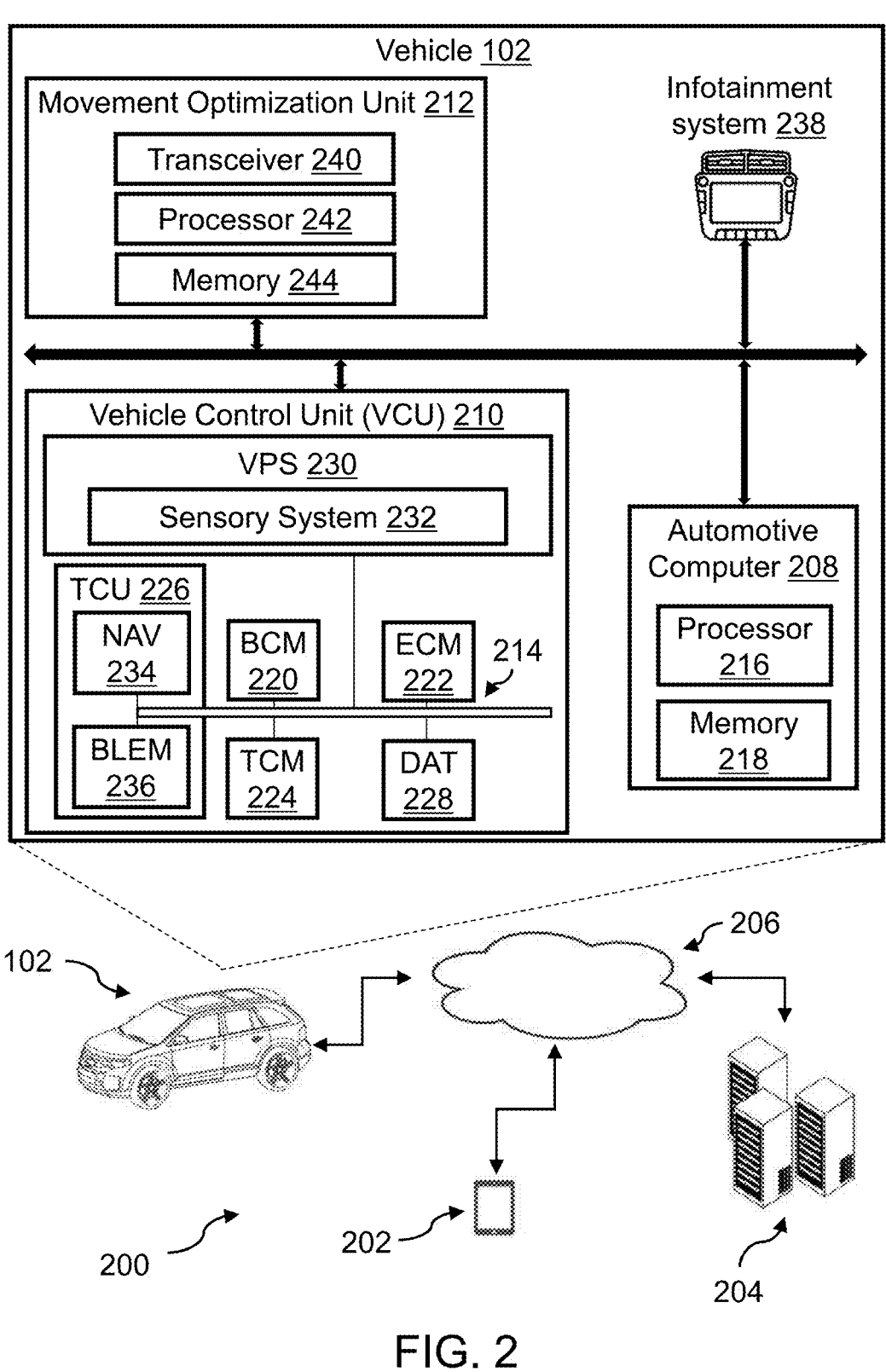
FIG. 2 depicts a block diagram of a system to optimize vehicle movement in a predefined geofenced area in accordance with the present disclosure.

FIG. 2 depicts a block diagram of a system 200 to optimize vehicle movement in the area 104 in accordance with the present disclosure. While describing FIG. 2, references will be made to FIG. 3.

The system 200 may include the vehicle 102, a user device 202 and one or more servers 204 (or a server 204) communicatively coupled with each other via one or more networks 206. The user device 202 may be associated with the vehicle driver and may be, for example, a mobile phone, a computer, a laptop, a smartwatch, a tablet, or any other device with communication capabilities. The server 204 may be part of a cloud-based computing infrastructure and may be associated with and/or include a Telematics Service Delivery Network (SDN) that provides digital data services to the vehicle 102 and other vehicles (not shown in FIG. 2) that may be part of a vehicle fleet. In further aspects, the server 204 may be associated with a fleet operator/manager, who may be managing operation of the vehicle 102 and other vehicles that may be part of a vehicle fleet. In additional aspects, the server 204 may be configured to store and provide to the vehicle 102 information associated with a desired vehicle operating parameter in the area 104. In some aspects, the information associated with the desired vehicle operating parameter may be in the form of a mapping between different desired vehicle operating parameters and different surface characteristics. For example, the information associated with a desired vehicle operating parameter may include a mapping of different desired vehicle speeds, slip control settings, ADAS settings, steering wheel angle limits, and/or the like and different coefficients of surface friction. In other aspects, the information associated with the desired vehicle operating parameter may be provided to the server 204 by the area owner and/or the fleet operator. For example, if the area owner desires the vehicle 102 to not move in the area 104 with a vehicle speed greater than 15 miles/hour, the area owner may input such speed limit on the server 204, and the server 204 may store the speed limit as the information associated with the desired vehicle operating parameter in the area 104.

In additional aspects, the server 204 may be configured to store and provide to the vehicle 102 information associated with different levels of sounds (e.g., "squeak" sounds) that emanate from vehicle tires when the tires contact and slip on surfaces with different coefficients of friction or surface types. Such information may facilitate the vehicle 102 to determine whether the vehicle tires may be slipping on the surface 106 when the vehicle 102 may be traveling in the area 104, based on the sound levels detected by the vehicle microphone.

The network(s) 206 illustrates an example communication infrastructure in which the connected devices discussed in various embodiments of this disclosure may communicate. The network(s) 206 may be and/or include the Internet, a private network, public network or other configuration that operates using any one or more known communication protocols such as transmission control protocol/Internet protocol (TCP/IP), Bluetooth®, Bluetooth Low Energy (BLE), Wi-Fi based on the Institute of Electrical and Electronics Engineers (IEEE) standard 802.11, Ultra-wideband (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

The vehicle 102 may include a plurality of units including, but not limited to, an automotive computer 208, a Vehicle Control Unit (VCU) 210, and a movement optimization unit 212 (or unit 212). The VCU 210 may include a plurality of Electronic Control Units (ECUs) 214 in communication with the automotive computer 208.

In some aspects, the automotive computer 208 and/or the unit 212 may be installed anywhere in the vehicle 102, in accordance with the disclosure. Further, the automotive computer 208 may operate as a functional part of the unit 212. The automotive computer 208 may be or include an electronic vehicle controller, having one or more processor(s) 216 and a memory 218. Moreover, the unit 212 may be separate from the automotive computer 208 (as shown in FIG. 2) or may be integrated as part of the automotive computer 208.

The processor(s) 216 may be in communication with one or more memory devices in communication with the respective computing systems (e.g., the memory 218 and/or one or more external databases not shown in FIG. 2). The processor(s) 216 may utilize the memory 218 to store programs in code and/or to store data for performing aspects in accordance with the disclosure. The memory 218 may be a non-transitory computer-readable medium or memory storing a vehicle movement optimization program code. The memory 218 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.).

In accordance with some aspects, the VCU 210 may share a power bus with the automotive computer 208 and may be configured and/or programmed to coordinate the data between vehicle 102 systems, connected servers (e.g., the server(s) 204), and other vehicles (not shown in FIG. 2) operating as part of a vehicle fleet. The VCU 210 may include or communicate with any combination of the ECUs 214, such as a Body Control Module (BCM) 220, an Engine Control Module (ECM) 222, a Transmission Control Module (TCM) 224, a Telematics Control Unit (TCU) 226, a Driver Assistances Technologies (DAT) controller 228, etc. The VCU 210 may further include and/or communicate with a Vehicle Perception System (VPS) 230, having connectivity with and/or control of one or more vehicle sensory system(s) 232 (or a "sensor unit"). The vehicle sensory system 232 may include one or more vehicle sensors including, but not limited to, a radio detection and ranging (radar) sensor configured for detection and localization of objects inside and outside the vehicle 102 using radio waves, sitting area buckle sensors, sitting area sensors, a light detecting and ranging (lidar) sensor, door sensors, proximity sensors, ultrasonic sensors, temperature sensors, wheel sensors, ambient weather sensors, vehicle internal and external cameras, an occupant sensing system, one or more rain sensors, capacitive moisture sensors, one or more microphones, etc.

In some aspects, the vehicle sensory system 232 may be configured to detect the surface characteristics of the surface 106 on which the vehicle 102 may be located. As described above in conjunction with FIG. 1, the surface characteristics may be, for example, a surface type, a surface friction coefficient, and/or the like. The vehicle sensory system 232 may be further configured to detect, via the microphone, a sound (or a level of sound) emanating from one or more vehicle wheels/tires when the tires contact the surface 106 or when the vehicle 102 moves on the surface 106. In an exemplary aspect, the vehicle sensory system 232 may detect the surface characteristics of the surface 106 based on the sound level emanating from the vehicle wheels/tires contacting the surface 106 and/or light reflectivity level off the surface 106. In this case, in one aspect, the vehicle sensory system 232 may itself determine the surface type and/or the surface friction coefficient based on the sound level and/or the light reflectivity level. For example, the vehicle sensory system 232 may estimate a low surface friction coefficient when the light reflectivity level may be high, or when a high sound level may be emanating from the vehicle tires when the vehicle 102 moves on the surface 106. In another aspect, the vehicle sensory system 232 may transmit information associated with the measured sound level and/or the light reflectivity level to the vehicle processor, and the vehicle processor may estimate the surface type and/or the surface friction coefficient based on the obtained information. In yet another aspect, the vehicle sensory system 232 and/or the vehicle processor may determine the surface characteristics based on the images (e.g., surface 106 images) captured by the vehicle's exterior cameras.

In some aspects, the VCU 210 may control vehicle operational aspects and implement one or more instruction sets received from the user device 202, the server 204, from one or more instruction sets stored in the memory 218, including instructions operational as part of the unit 212.

The TCU 226 may be configured and/or programmed to provide vehicle connectivity to wireless computing systems onboard and off board the vehicle 102 and may include a Navigation (NAV) receiver 234 for receiving and processing a GPS signal, a BLE Module (BLEM) 236, a Wi-Fi transceiver, a UWB transceiver, and/or other wireless transceivers (not shown in FIG. 2) that may be configurable for wireless communication (including cellular communication) between the vehicle 102 and other systems (e.g., a key fob, not shown), computers, and modules. The TCU 226 may be in communication with the ECUs 214 by way of a bus. In some aspects, the NAV receiver 234 may be configured to determine a real-time vehicle geolocation.

The ECUs 214 may control aspects of vehicle operation and communication using inputs from human drivers, inputs from an autonomous vehicle controller, the unit 212, and/or via wireless signal inputs received via the wireless connection(s) from other connected devices, such as the user device 202, the server(s) 204, among others.

The BCM 220 generally includes integration of sensors, vehicle performance indicators, and variable reactors associated with vehicle systems and may include processor-based power distribution circuitry that can control functions associated with the vehicle body such as lights, windows, security, camera(s), headlights, audio system(s), speakers, wipers, door locks and access control, driver/front passenger/rear sitting areas, and various comfort controls. The BCM 220 may also operate as a gateway for bus and network interfaces to interact with remote ECUs (not shown in FIG. 2).

The DAT controller 228 may provide Level-1 through Level-3 automated driving and driver assistance functionality that may include, for example, active parking assistance, vehicle backup assistance, and adaptive cruise control, among other features. The DAT controller 228 may also provide aspects of user and environmental inputs usable for user authentication.

In some aspects, the automotive computer 208 may connect with an infotainment system 238 (or a vehicle Human-Machine Interface (HMI)). The infotainment system 238 may include a touchscreen interface portion and may include voice recognition features, biometric identification capabilities that can identify users based on facial recognition, voice recognition, fingerprint identification, or other biological identification means. In other aspects, the infotainment system 238 may be further configured to receive user instructions/inputs via the touchscreen interface portion and/or display notifications/recommendations, navigation maps, etc. on the touchscreen interface portion.

The computing system architecture of the automotive computer 208, the VCU 210, and/or the unit 212 may omit certain computing modules. It should be readily understood that the computing environment depicted in FIG. 2 is an example of a possible implementation according to the present disclosure, and thus, it should not be considered limiting or exclusive.

In accordance with some aspects, the unit 212 may be integrated with and/or executed as part of the ECUs 214. The unit 212, regardless of whether it is integrated with the automotive computer 208 or the ECUs 214, or whether it operates as an independent computing system in the vehicle 102, may include a transceiver 240, a processor 242, and a computer-readable memory 244, which may be communicatively coupled with each other.

The transceiver 240 may be configured to receive information/inputs from one or more external devices or systems, e.g., the user device 202, the server(s) 204, and/or the like via the network 206. For example, the transceiver 240 may receive the information associated with the desired vehicle operating parameter in the area 104 and/or the information associated with different levels of sounds that emanate from vehicle tires when the tires contact and slip on surfaces with different coefficients of friction or surface types from the server(s) 204 via the network 206. Further, the transceiver 240 may transmit notifications (e.g., alert/alarm signals) to the external devices or systems. In addition, the transceiver 240 may be configured to receive information/inputs from vehicle 102 components such as the infotainment system 238, the vehicle sensory system 232, the TCU 226, and/or the like. Further, the transceiver 240 may transmit notifications (e.g., alert/alarm/command signals) to the vehicle 102 components such as the infotainment system 238, the VCU 210, etc.

The processor 242 and the memory 244 may be the same as or similar to the processor 216 and the memory 218, respectively. In some aspects, the processor 242 may utilize the memory 244 to store programs in code and/or to store data for performing aspects in accordance with the disclosure. The memory 244 may be a non-transitory computer-readable medium or memory storing the vehicle movement optimization program code. In some aspects, the memory 244 may be configured to store the information associated with the desired vehicle operating parameter in the area 104 and/or the information associated with different levels of sounds that emanate from vehicle tires when the tires contact and slip on surfaces with different coefficients of friction or surface types, which the vehicle 102 obtains from the server(s) 204.

In operation, the processor 242 may obtain and monitor inputs from the vehicle sensory system 232 and/or the TCU 226, when the vehicle 102 may be traveling. The processor 242 may determine that the vehicle 102 may be entering or located at the area 104 based on the inputs obtained from the vehicle sensory system 232 and/or the TCU 226. Specifically, in one exemplary aspect, the processor 242 may compare the real-time vehicle geolocation determined by the TCU 226 with a geolocation information associated with the area 104 (that may be pre-stored in the memory 244 or obtained from the server 204) and determine that the vehicle 102 may be located in the area 104 when the real-time vehicle geolocation matches with the area 104 geolocation.

In some aspects, the geolocation information associated with the area 104 may be provided to the server 204 by an area owner. For example, the area owner may "define" the geofenced boundaries of the area 104 in which the area owner may desire to have vehicles travel in a predefined manner. For example, the area owner may define a drive way, a parking lot, passages/private roads inside a building complex, etc. as the area 104 in which the area owner may desire to have vehicles (e.g., commercial vehicles, taxis, delivery vehicles, etc.) travel in a predefined manner, so that the area 104 conditions/surface 106 is not affected and/or the building occupants are not inconvenienced.

In another exemplary aspect, the processor 242 may compare the images of vehicle's surroundings captured by the vehicle cameras (that may be part of the inputs obtained from the vehicle sensory system 232) with one or more area 104 images (that may be pre-stored in the memory 244 or obtained from the server 204) and determine that the vehicle 102 may be located in the area 104 when the images captured by the vehicle cameras match with the area 104 images.

Responsive to determining that the vehicle 102 may be located at the area 104, the processor 242 may activate a vehicle movement optimization mode. Stated another way, responsive to determining that the vehicle 102 is located in an area that may be a private property and may hence have predefined "vehicle movement rules" associated with it, the processor 242 may activate the vehicle movement optimization mode, so that the vehicle 102 travels in the area 104 according to the predefined vehicle movement rules.

Responsive to activating the vehicle movement optimization mode or responsive to determining that the vehicle 102 may be located at the area 104, the processor 242 may obtain the surface characteristics associated with the surface 106 from the vehicle sensory system 232 or itself determine the surface characteristics based on the inputs obtained from the vehicle sensory system 232. As described above, the surface characteristics may be, for example, a surface friction coefficient, a surface type, and/or the like.

In one exemplary aspect, the vehicle sensory system 232 and/or the processor 242 may determine the surface characteristics based on images captured by the vehicle cameras. For example, the vehicle sensory system 232 and/or the processor 242 may determine whether the surface 106 is made of epoxy or any other reflective surface, or concrete/asphalt (i.e., the surface type), based on the images captured by the vehicle cameras. In another exemplary aspect, the vehicle sensory system 232 and/or the processor 242 may determine the surface characteristics based on surface or light reflectivity off the surface 106 captured by the vehicle sensory system 232. For example, the vehicle sensory system 232 and/or the processor 242 may estimate the surface friction coefficient based on the surface or light reflectivity measured by the vehicle sensory system 232. A person ordinarily skilled in the art may appreciate that the surface friction coefficient may be low when the surface or light reflectivity off the surface 106 may be high (e.g., in the case of an epoxy floor/surface) and vice-versa.

In yet another aspect, the processor 242 may determine the surface characteristics by correlating the level of sound (captured by the vehicle microphones) that may be emanating from the vehicle tires when the tires move on the surface 106 with the information associated with different levels of sounds (e.g., "squeak" sounds) that emanate from vehicle tires when the tires contact and slip on surfaces with different coefficients of friction or surface types (which may be obtained from the server 204). In this case, the processor 242 may correlate the measured sound level of vehicle 102 tires with the information obtained from the server 204 and estimate the surface type and/or the surface friction coefficient associated with the surface 106 based on the correlation. In some aspects, the information associated with the different levels of sounds, as described above, may be provided to the server 204 by the vehicle manufacturer and/or may be developed by the server 204 itself by using machine learning and sound data obtained from a plurality of vehicles moving on different types of surfaces, collected over a period of time.

Responsive to determining or obtaining the surface characteristics as described above, the processor 242 may compare the surface characteristics with predefined characteristics. The information associated with the predefined characteristics may be pre-stored in the memory 244 and/or obtained from the server 204. In some aspects, the information associated with the predefined characteristics may be set/defined by the area owner, the fleet manager and/or the vehicle manufacturer.

In some aspects, when the surface characteristics are associated with the surface type, the processor 242 may compare the determined surface type with a predefined type (e.g., an epoxy floor/surface). Responsive to the comparison, the processor 242 may determine that the surface characteristics may be equivalent to the predefined characteristics when the determined surface type may be equivalent to the predefined type. As an example, the processor 242 may determine that the surface characteristics may be equivalent to the predefined characteristics when the surface 106 may be an epoxy floor/surface.

In other aspects, when the surface characteristics are associated with the surface friction coefficient, the processor 242 may compare the determined surface friction coefficient with a predefined friction coefficient. Responsive to the comparison, the processor 242 may determine that the surface characteristics may be equivalent to the predefined characteristics when the determined surface friction coefficient may be equivalent to or less than the predefined friction coefficient. As an example, the processor 242 may determine that the surface characteristics may be equivalent to the predefined characteristics when the surface 106 may be slippery or may have a low surface friction coefficient (which, for example, is characteristic of an epoxy floor).

Responsive to determining that the surface characteristics may be equivalent to the predefined characteristics, the processor 242 may adjust one or more vehicle operating parameters according to the rules set/defined by the area owner, the fleet manager, and/or the like. Specifically, responsive to determining that the surface characteristics may be equivalent to the predefined characteristics, the processor 242 may fetch the information associated with the desired vehicle operating parameter in the area 104 from the memory 244 or the server 204 and adjust the vehicle operating parameters based on the fetched information.

In some aspects, the information associated with the desired vehicle operating parameter may be provided to the server 204 by the area owner (i.e., a "user" associated with the area 104) and/or the fleet manager. For example, the area owner may define or provide information to the server 204 indicating that maximum allowable vehicle speed may be 15 miles/hour in the driveway associated with the area 104, 5 miles/hour in the parking lot, 2 miles/hour in the building, and/or the like. The processor 242 may use such information obtained from the server 204 and may adjust the vehicle 102 speed limit in the area 104 based on the speed limit(s) described in the information. In this manner, the processor 242 may facilitate the vehicle driver to drive within the preferred speed limit in the area 104. If the vehicle 102 is an autonomous vehicle, the processor 242 may itself reduce the vehicle 102 speed, so that the vehicle 102 may travel in the area 104 according to the preferred speed limit.

In some aspects, the area owner and the fleet manager may "negotiate" on optimal vehicle operating parameters in the area 104 (e.g., an optimal vehicle speed limit) via the server 204, and the server 204 may store and provide to the vehicle 102 the information associated with the desired vehicle operating parameter that may be finalized (or accepted) by the area owner and the fleet manager.

Figure 3:
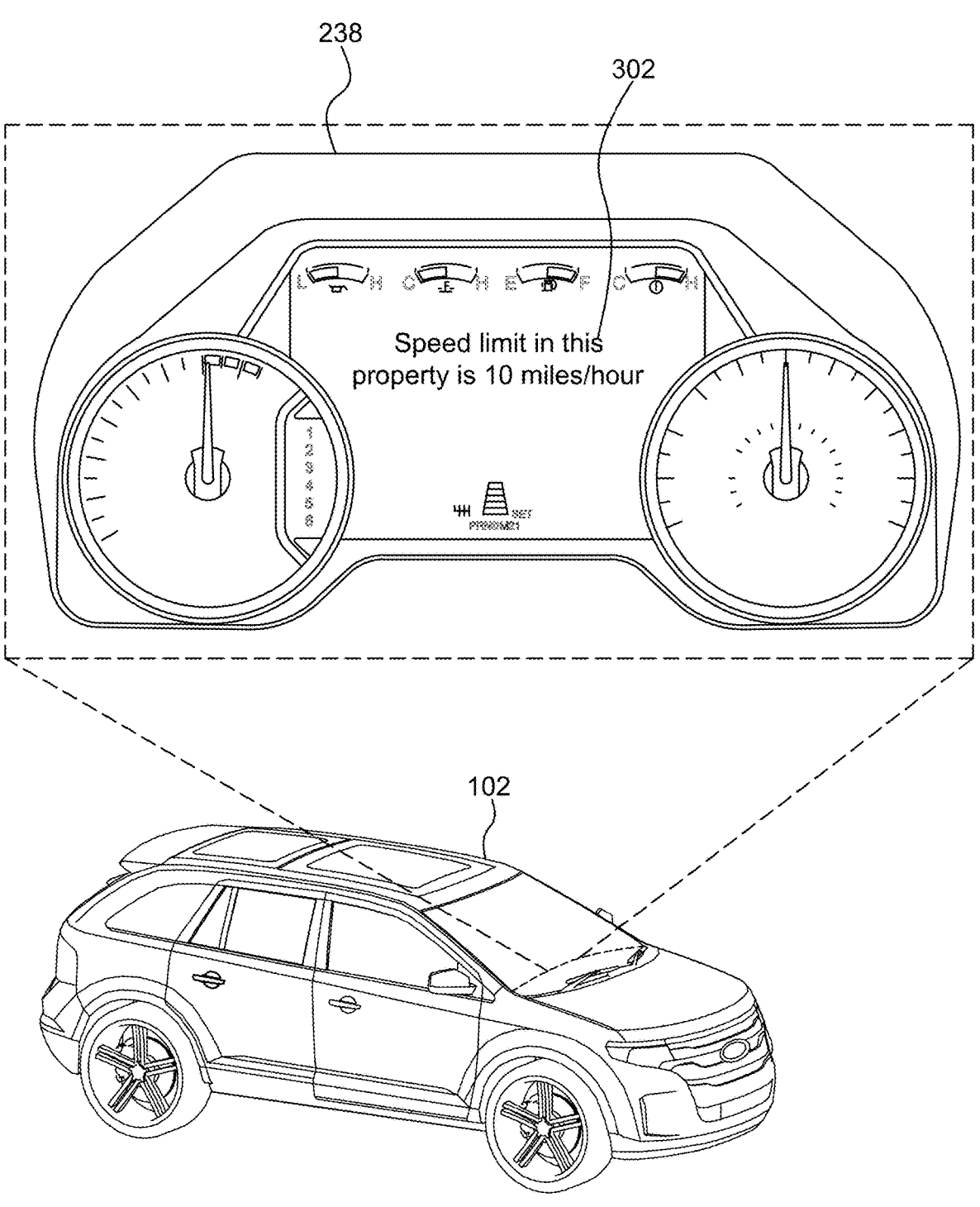
FIG. 3 depicts a view of a vehicle Human-Machine Interface (HMI) in accordance with the present disclosure.

In further aspects, in addition or alternative to automatically adjusting the vehicle operating parameter based on the information as described above, the processor 242 may output (via an audible message or visually) the information on the user device 202 and/or the infotainment system 238, responsive to determining that the vehicle 102 may be located in the area 104. An example view of a message 302 stating that the "Speed limit in this property is 10 miles/hour" is depicted in FIG. 3. Such a message may be displayed on the infotainment system 238 (as shown in FIG. 3) and/or the user device 202 when the vehicle 102 may be located in the area 104, so that the vehicle driver may be aware of the "rules" to drive the vehicle 102 in the area 104.

In some aspects, when the information associated with the desired vehicle operating parameter is provided to the server 204 by both the area owner and the fleet manager, the processor 242 may "select" that information to use that may be more conservative to implement in the area 104. For example, if the information provided by the fleet manager indicates a speed limit of 20 miles/hour in the area 104 and the information provided by the area owner indicates a speed limit of 15 miles/hour in the area 104, the processor 242 may select the information provided by the area owner and adjust the vehicle 102 speed limit as 15 miles/hour when the vehicle 102 travels in the area 104.

Although the description above describes an aspect where the information associated with the desired vehicle operating parameter is provided to the server 204 by the area owner and/or the fleet manager, the present disclosure is not limited to such an aspect. In additional or alternative aspects, the information associated with the desired vehicle operating parameter may be in the form of a mapping between different desired vehicle operating parameters and different surface characteristics, which may be provided to the server 204 by the vehicle manufacturer (and/or the fleet manager) or may be determined/generated by the server 204 itself by using machine learning and vehicle data obtained from a plurality of vehicle over a period of time.

In this aspect, responsive to determining the surface characteristics, the processor 242 may fetch the mapping between different desired vehicle operating parameters and different surface characteristics and correlate the determined surface characteristics with the mapping to determine the desired vehicle operating parameters for the vehicle 102 in the area 104. For example, the processor 242 may adjust the vehicle's ADAS setting (e.g., error state prevention may be programmed differently) based on whether the surface 106 is slippery or made of concrete/asphalt. As another example, the processor 242 may adjust the vehicle's slip control setting to lower slip targets when the surface friction coefficient may be low, to prevent the vehicle 102 from slipping while moving and thereby preventing the surface 106 from getting tire marks. In this case, the processor 242 may update the ABS setting, the traction control setting, and/or the electronic stability control (ESC) setting to lower slip targets based on the determined surface characteristics (e.g., the surface friction coefficient and/or the surface type). A person ordinarily skilled in the art may appreciate that on a slippery surface (e.g., an epoxy floor), the vehicle tires may overheat the epoxy floor and grind through it with unintentional wheel spin. Therefore, updating the traction control setting (and other vehicle slip control setting) may prevent such an event from happening and affecting the condition/appearance of the surface 106.

Although the description above describes an aspect where the processor 242 adjusts/updates the vehicle operating parameters based on the surface characteristics or responsive to determining that the surface characteristics are equivalent to the predefined characteristics, the present disclosure is not limited to such an aspect. In additional or alternative aspects, the processor 242 may compare the sound level of sound emanating from the vehicle tires (when the tires may be moving on the surface 106) with a predefined level and adjust the vehicle operating parameters when the sound level determined by the vehicle microphones may be greater than the predefined level. In this case also, the processor 242 may adjust the vehicle operating parameters based on the information associated with the desired vehicle operating parameters obtained from the server 204. In other aspects, the processor 242 may adjust the vehicle operating parameters such that the sound level may reduce below the predefined level.

A person ordinarily skilled in the art may appreciate that the area occupants may face inconvenience when the vehicle tires may be making loud or squeaking noise when the vehicle 102 moves on the surface 106. Further, the probability of the tires leaving tire marks on the surface 106 (and thus affecting the condition/appearance of the surface 106) is high when the tires may be making loud or squeaking noise while moving on the surface 106. To prevent such events from happening, the processor 242 may adjust the vehicle operating parameters so that the sound level may reduce below the predefined level.

As an example, the processor 242 may adjust the vehicle speed limit and/or vehicle slip targets/settings to lower thresholds to prevent the tire sound from occurring. The processor 242 may additionally store the slip thresholds/settings in the memory 244 (for machine learning purposes) and/or transmit the slip thresholds/settings to other vehicles (not shown) located in the area 104 to prevent the other vehicles from making similar noise/sound. In some aspects, the processor 242 may transmit the slip thresholds/settings to the other vehicles via vehicle-to-vehicle (V2V) communication.

In additional aspects, when the vehicle 102 is an autonomous vehicle (or even otherwise), the processor 242 may determine a steering wheel position and/or a torque application rate that resulted in the tire sound greater than the predefined level and transmit information associated with the determined steering wheel position and/or the torque application rate to the memory 244 and/or the server 204 for storage and machine learning purposes. The processor 242 may additionally transmit the information associated with the determined steering wheel position and/or the torque application rate to the other vehicles via V2V communication. Furthermore, in this case, the processor 242 may autonomously adjust the rate of torque application and steering wheel rate/angle limit to reduce the tire sound below the predefined level and/or eliminate the sound. In further aspects, the processor 242 may estimate forces acting on the tires when the tires may be making sound above the predefined level and set control limits on the forces, to stay below the force limits. The processor 242 may additionally limit the steering wheel angle movement to reduce the sound (and accordingly plan the autonomous vehicle path or movement).

Similar to transmitting the information associated with the determined steering wheel position and/or the torque application rate to the other vehicles via V2V communication, the processor 242 may transmit the information associated with the desired vehicle operating parameters to the other vehicles, so that the other vehicles may also apply similar settings. Furthermore, although the description above describes an aspect where the processor 242 obtains the information associated with the desired vehicle operating parameters from the server 204, in additional or alternative aspects, the processor 242 may obtain this information from one or more other vehicles that may be located in the area 104. In this manner, information associated with optimal traction control setting, ABS setting, stability control events/ settings, ADAS settings, vehicle speed setting, etc. may be shared within vehicles in the area 104, thereby facilitating a plurality of vehicles in the area 104 to move optimally.

In some aspects, the information described above may be shared between the vehicles directly via V2V communication. In other aspects, the information may be shared between the vehicles via the server 204 or the fleet manager/ operator. In this case, the fleet manager/operator may monitor the information obtained from a plurality of vehicles at the server 204 and may update the desired vehicle operating parameters over time so that the driver experience is not compromised and, at the same time, the area owner and occupants are not inconvenienced.

In addition to monitoring the information obtained from a plurality of vehicles, the fleet manager/operator may also monitor driver feedback that may be obtained at the server 204 via respective vehicle's HMI and/or driver's user device (or via voice input) and update the desired vehicle operating parameters over time based on the driver feedback. In this case, as an example, the driver may provide a feedback to the fleet operator when the driver perceives the vehicle speed limit to be too high for the area 104, or when the driver believes that the vehicle's slip control thresholds should be further reduced, and/or the like. In some aspects, the processor 242 may also enable the driver to override the implemented vehicle operating parameter settings, if deemed necessary, while driving the vehicle 102 in the area 104.

In addition to adjusting the vehicle operating parameters as described above when the vehicle 102 is located in the area 104, the processor 242 may enable additional features that may facilitate the driver to conveniently drive the vehicle 102 in the area 104 and/or enhance the convenience of the area owner/occupants. For example, the processor 242 may use ADAS radars to detect objects in proximity to the vehicle 102 when the vehicle 102 may be traveling in the area 104 and reduce the vehicle speed and/or power output when such objects may be detected.

The processor 242 may further activate a vehicle horn, a vehicle exterior light, a sound exciter, and/or the like, when the vehicle 102 may be located or traveling in the area 104. The processor 242 may perform such activation actions when the fleet manager and/or the area owner include such activation instructions in the information associated with the desired vehicle operating parameters (that is provided to the server 204 by the fleet manager and/or the area owner, as described above). Examples of such activation actions or instructions include, but are not limited to, activation of horns at the intersections, activation of vehicle exterior lights and/or sound exciters when the vehicle 102 is within the area 104 boundaries, and/or the like.

In further aspects, when the vehicle 102 is located in the area 104 and an alarm signal is obtained by the processor 242 from the server 204, other vehicles, computing system/ sensors associated with the area 104, and/or the like, the processor 242 may obtain information associated with an optimal vehicle operating parameter in such situations from the server 204. Responsive to obtaining the information associated with the optimal vehicle operating parameter, the processor 242 may adjust the vehicle operating parameter based on the obtained information. In some aspects, such information may be provided to the server 204 by the area owner and/or the fleet manager. For example, the area owner and/or the fleet manager may instruct that whenever the vehicle 102 obtains the alarm signal, the vehicle 102 should immediately exit the area 104 from the nearest exit location, or reduce the vehicle speed and/or switch on the vehicle exterior lights, and/or the like. Responsive to obtaining such information, the processor 242 may accordingly adjust the vehicle operating parameters and/or cause the vehicle 102 to move in the prescribed manner after obtaining the alarm signal. In alternative aspects, the processor 242 may output instructions on the user device 202 and/or the infotainment system 238, requesting the driver to drive the vehicle 102 in the prescribed manner, after obtaining the alarm signal.

Figure 4:
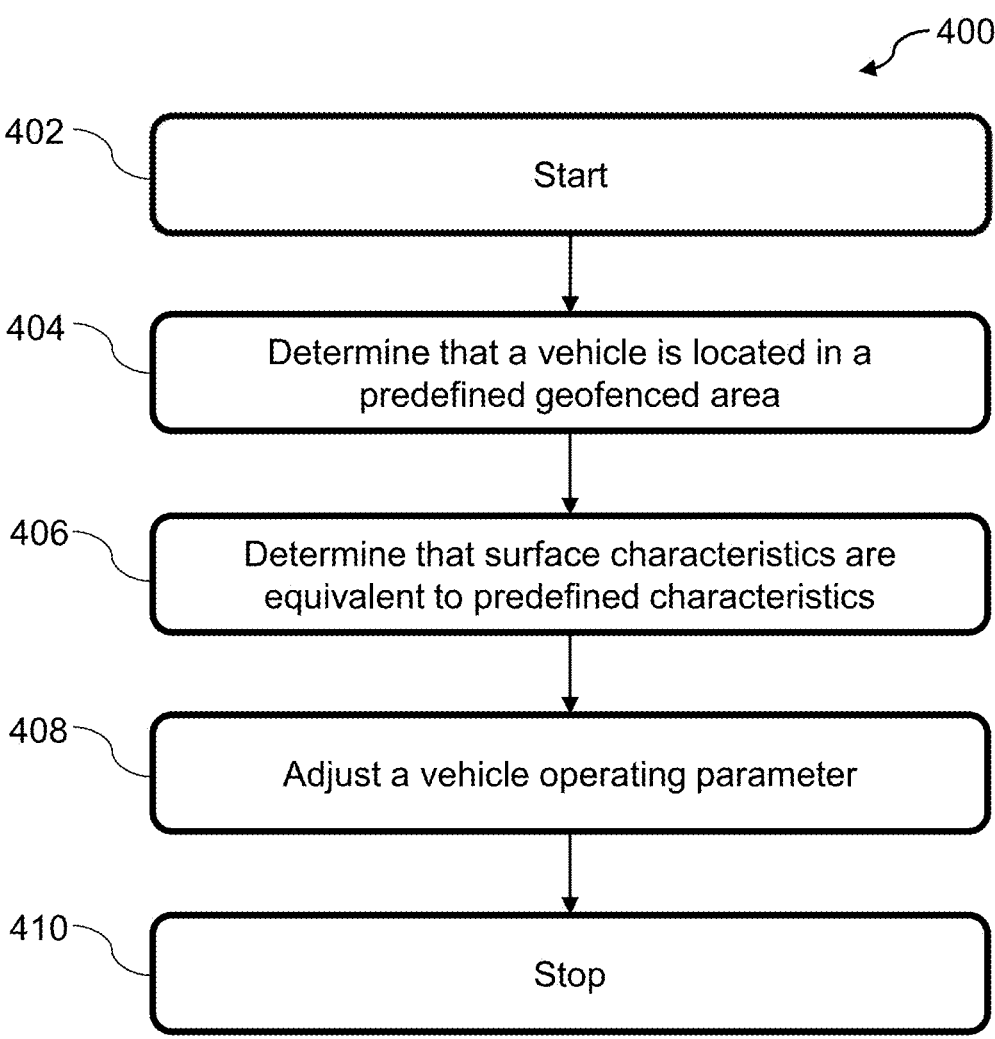
FIG. 4 depicts a flow diagram of a method to optimize vehicle movement in a predefined geofenced area in accordance with the present disclosure.

FIG. 4 depicts a flow diagram of a method 400 to optimize vehicle movement in the area 104 in accordance with the present disclosure. FIG. 4 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 400 starts at step 402. At step 404, the method 400 may include determining, by the processor 242, that the vehicle 102 is located in the area 104. At step 406, the method 400 may include determining, by the processor 242, that the surface characteristics associated with the surface 106 may be equivalent to the predefined characteristics, responsive to determining that the vehicle 102 is located in the area 104. At step 408, the method 400 may include adjusting, by the processor 242, one or more vehicle operating parameters responsive to determining that the surface characteristics may be equivalent to the predefined characteristics.

The method 400 may end at step 410.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A vehicle comprising:
   a sensor unit configured to detect surface characteristics of a surface on which the vehicle is located, wherein the sensor unit is configured to detect the surface characteristics based on at least sound emanating from one or more vehicle wheels of the vehicle contacting the surface, wherein the sensor unit comprises a microphone configured to detect the sound emanating from the one or more vehicle wheels contacting the surface; and
   a processor communicatively coupled with the sensor unit, wherein the processor is configured to:
   determine that a sound level of the sound is greater than a predefined level;

determine that the vehicle is located in a predefined geofenced area;

determine that the surface characteristics are equivalent to predefined characteristics based on inputs obtained from the sensor unit, responsive to determining that the vehicle is located in the predefined geofenced area;

adjust a vehicle operating parameter responsive to determining that the surface characteristics are equivalent to the predefined characteristics responsive to determining that the sound level is greater than the predefined level.

2. The vehicle of claim 1, wherein the surface characteristics comprise a surface friction coefficient (μ), and wherein the processor is further configured to:

compare the surface friction coefficient with a predefined friction coefficient; and determine that the surface characteristics are equivalent to the predefined characteristics when the surface friction coefficient is equivalent to or less than the predefined friction coefficient.

3. The vehicle of claim 1, wherein the surface characteristics comprise a surface type, and wherein the processor is further configured to determine that the surface characteristics are equivalent to the predefined characteristics when the surface type is equivalent to a predefined type.

4. The vehicle of claim 1, further comprising a telematics control unit (TCU) configured to determine a real-time vehicle geolocation, wherein the processor is further configured to:

compare the real-time vehicle geolocation with a geolocation associated with the predefined geofenced area; and determine that the vehicle is located in the predefined geofenced area based on comparing the real-time vehicle geolocation with the geolocation associated with the predefined geofenced area.

5. The vehicle of claim 1, wherein the sensor unit comprises a vehicle camera, and wherein the inputs obtained from the sensor unit comprise one or more images captured by the vehicle camera.

6. The vehicle of claim 5, wherein the processor is further configured to determine that the vehicle is located in the predefined geofenced area based on the one or more images.

7. The vehicle of claim 1, wherein the vehicle operating parameter comprises at least one of a vehicle Advanced Driver Assistance System (ADAS) setting, a vehicle slip control setting, a steering wheel angle limit, a vehicle wheel force control setting, a rate of torque application, or a vehicle speed.

8. The vehicle of claim 7, wherein the vehicle slip control setting comprises at least one of an ABS setting, a traction control setting or an electronic stability control setting.

9. The vehicle of claim 1, wherein the processor is further configured to:

fetch an information associated with a desired vehicle operating parameter in the predefined geofenced area from a server or a vehicle memory, responsive to determining that the surface characteristics are equivalent to the predefined characteristics; and adjust the vehicle operating parameter based on the information associated with the desired vehicle operating parameter.

10. The vehicle of claim 9, wherein the desired vehicle operating parameter is based on the surface characteristics.

11. The vehicle of claim 9, wherein the information associated with the desired vehicle operating parameter is preset by a user or obtained from one or more additional vehicles.

12. The vehicle of claim 9, wherein the processor is further configured to transmit the information associated with the desired vehicle operating parameter to one or more additional vehicles located at the predefined geofenced area.

13. The vehicle of claim 9, wherein the processor is further configured to output the information associated with the desired vehicle operating parameter on a vehicle Human-Machine Interface (HMI) or a user device.

14. The vehicle of claim 1, wherein the processor is further configured to:

determine at least one of a steering wheel position or a torque associated with the vehicle when the sound level is greater than the predefined level; and transmit an information associated with at least one of the steering wheel position or the torque to a server, a vehicle memory or one or more additional vehicles located in the predefined geofenced area.

15. The vehicle of claim 1, wherein the sensor unit is further configured to detect the surface characteristics based on light reflectivity off the surface.

16. The vehicle of claim 1, wherein the processor is further configured to activate at least one of a vehicle horn, a vehicle exterior light, or a sound exciter responsive to determining that the vehicle is located in the predefined geofenced area.

17. The vehicle of claim 1, wherein the processor is further configured to:

obtain an alarm signal when the vehicle is located in the predefined geofenced area;

obtain an information associated with an optimal vehicle operating parameter responsive to obtaining the alarm signal; and adjust the vehicle operating parameter based on the information associated with the optimal vehicle operating parameter.

* * * * *